Dec. 30, 1924.

A. D. PARKER

MIXING MACHINE

Filed Nov. 10, 1919

1,521,044

WITNESS:
Rob. R. Kitchel.

INVENTOR
Alexis D. Parker
BY Augustus B. Stoughton
ATTORNEY.

Patented Dec. 30, 1924.

1,521,044

UNITED STATES PATENT OFFICE.

ALEXIS D. PARKER, OF VILLA NOVA, PENNSYLVANIA, ASSIGNOR TO AMERICAN BRIQUET COMPANY, OF PHILADELPHIA, PENNSYLVANIA, A CORPORATION OF DELAWARE.

MIXING MACHINE.

Application filed November 10, 1919. Serial No. 336,921.

*To all whom it may concern:*

Be it known that I, ALEXIS D. PARKER, a citizen of the United States, residing at Villa Nova, in the county of Delaware and State of Pennsylvania, have invented a certain new and useful Mixing Machine, of which the following is a specification.

The principal object of the present invention is to provide a machine for successfully mixing and feeding an agglomeration of fine material, as pulverulent coal, and a binder, as a mixture or emulsion of mineral oil and a vegetable paste and water.

The invention will be claimed at the end hereof, but will be first described in connection with the embodiment of it chosen from other embodiments for the sake of illustration in the accompanying drawings forming part hereof and in which—

Figure 1:
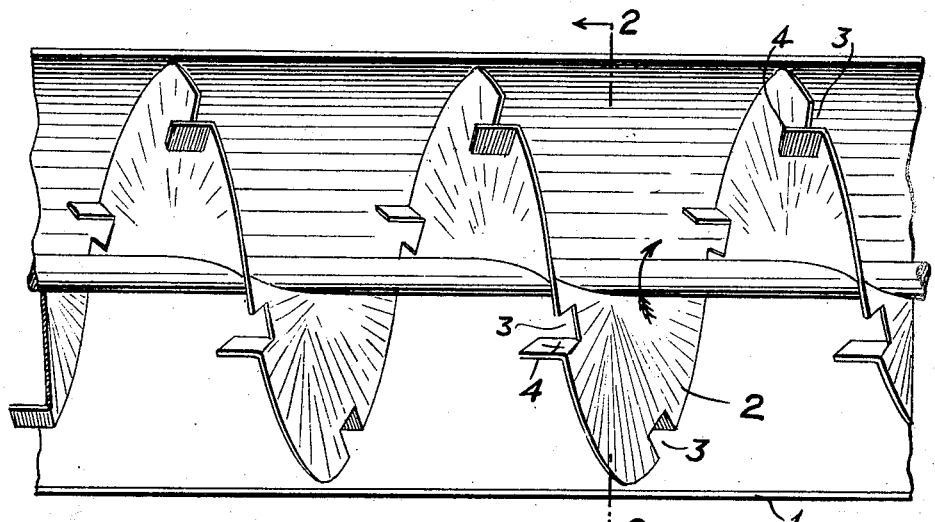
Figure 1, is a top or plan view of so much of a mixing machine as is necessary for illustrating an embodiment of the invention.
Figure 2:
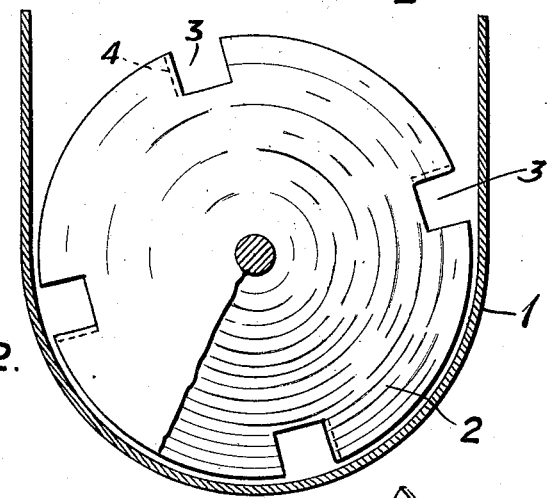
Fig. 2, is a sectional view taken on the line 2—2, of Figure 1, looking in the direction of the arrows.
Figure 3:
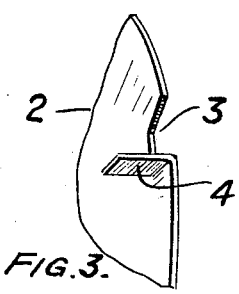
Figs. 3 and 4, are detached perspective views illustrating a detail of construction and a modification thereof.
Figure 4:
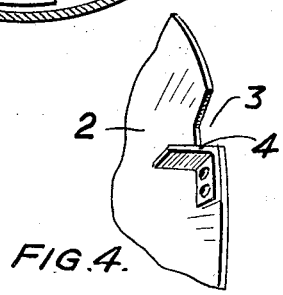

In the drawings 1 and 2, are the trough and screw conveyer elements common to mixing machines of the type to which my invention is applicable. 3, are notches, shown as generally rectangular, and provided in the margin of the flights of the conveyer. As indicated on the drawings the notches 3, are spaced ninety degrees apart. 4, are blades shown as rectangular and they extend from the side wall of the notches forward in the direction of feed of the conveyer. The blades 4, are attached to or bent up from the conveyer and they are shown as arranged on the leading sides of the notches 3, leaving the material, or more accurately some of it, free to pass through the notches and be carried and stirred by the blades. The area of the notches and the area of the blades are substantially the same, although the latter may be sufficiently smaller to provide clearance.

The described provision of notches and blades not only improves the mixing operation, as has been indicated, but also clears the conveyer and facilitates the feed, so that the machine works continuously and affords a thorough mixture.

Modification may be made in details of construction and arrangement and therefore the invention is not limited as to such matters or otherwise than as the prior art and the appended claims may require.

I claim:

1. In a machine for mixing coal briquettes materials and the like consisting of a trough and a screw conveyer the combination with angularly spaced notches provided in the margin of the flights of the conveyer, of blades extending from a side wall of the notches forward in the direction of feed of the conveyer.

2. In a machine for mixing coal briquettes materials and the like consisting of a trough and a screw conveyer the combination with notches provided in the margin of the flights of the conveyer of blades extending from the flights forward in the direction of feed.

3. In a machine for mixing coal briquettes materials and the like consisting of a trough and a screw conveyer the combination with rectangular notches provided in the margin of the flights of the conveyor of rectangular blades of substantially the same area as the notches extending forward in the direction of feed.

ALEXIS D. PARKER.